W. H. ARNOLD.
TROLLEY WHEEL CONSTRUCTION.
APPLICATION FILED AUG. 26, 1912.
1,093,025.
Patented Apr. 14, 1914.
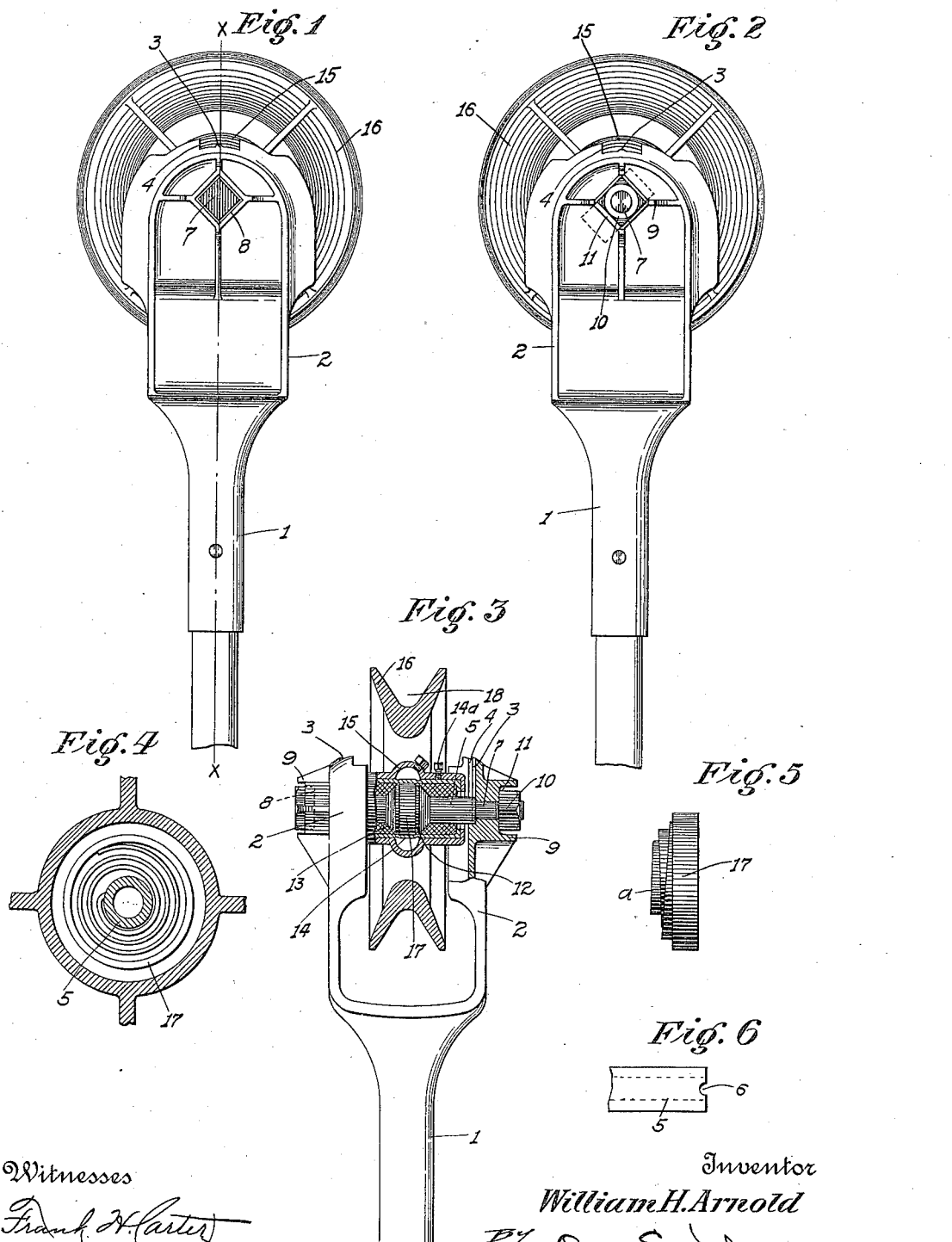
Witnesses
Frank H. Carter
J.␣␣␣␣␣␣
Inventor
William H. Arnold
By Perry S. Webster
Attorney
COLUMBIA PLANOGRAPH CO., WASHINGTON, D. C.

UNITED STATES PATENT OFFICE.

WILLIAM H. ARNOLD, OF STOCKTON, CALIFORNIA.

TROLLEY-WHEEL CONSTRUCTION.

1,093,025.      Specification of Letters Patent.      Patented Apr. 14, 1914.

Application filed August 26, 1912. Serial No. 716,970.

*To all whom it may concern:*

Be it known that I, WILLIAM H. ARNOLD, a citizen of the United States, residing at Stockton, in the county of San Joaquin, State of California, have invented certain new and useful Improvements in Trolley-Wheel Construction; and I do declare the following to be a clear, full, and exact description of the same, such as will enable others skilled in the art to which it appertains to make and use the same, reference being had to the accompanying drawings, and to the characters of reference marked thereon, which form a part of this application.

This invention relates to improvements in trolley wheels and particularly to the bearing means thereof and means for inserting the same in the trolley harp, the object of the invention being to produce a simplified and accurate means for securing the bearing pin of the wheel in the trolley harp in such a manner as will cause it to remain stationary therein with no danger of the same becoming loose or dropping out and also one in which the same can be inserted readily and effectively with a minimum amount of labor.

A further object of the invention is to produce a simple and inexpensive device and yet one which will be exceedingly effective for the purposes for which it is designed.

These objects, I accomplish by means of such structure and relative arrangement of the parts as will fully appear by a perusal of the following specification and claim.

On the drawings similar characters of reference indicate corresponding parts in the several views.

Figure 1 is a side elevation of the complete device. Fig. 2 is a similar view of the other side of the view shown in Fig. 1. Fig. 3 is a sectional view taken on a line X—X of Fig. 1. Fig. 4 is a fragmentary view in section showing a contact spring. Fig. 5 is a detached side view of a contact spring. Fig. 6 is a top plan view of a pin structure.

Referring now more particularly to the characters of reference on the drawings, the numeral 1 designates the pin of the trolley harp 2, which trolley harp is provided in the upper end of each of its branches with a vertical groove 3 provided with a central inwardly projecting flange or guide 4 adapted to receive a pin 5 by means of grooves 6 in the ends of said pin. When said pin is in position in said grooves then a bolt 7 is projected through the pin and through the branches of the harp 2, one of said branches being provided with a square recess 8 to receive the head of the bolt 7 and prevent it from turning. The other branch of the harp is provided with four projecting lugs 9 whereby when the nut 10 is mounted on the bolt 7, a plate 11 may be mounted over the bolt 7 and be held from turning between the lugs 9, which plate 11 will be bent over the sides of the nut 10 to keep it from turning, thus locking the pin, bolt and nut in fixed position with respect to the harp so that when the trolley wheel turns, as will be shown, there is no additional friction due to any movement of such bolt, pin and nut and also the wheel is held against coming loose in the harp.

On the pin 5 are two spaced bearing shoulders 12 mounted over which are two bushings 13 inclosed in a casing 14. Said casing 14 is disposed within the hub 15 of the wheel 16. If desired the casing 14 may be held in the hub 15 by means of set screws 14ª or other suitable means, thus permitting the casing 14 to be removed and replaced if desired. As stated the shoulders 12 are spaced apart and in the intermediate space is disposed a helical spring 17 which bears on its outer periphery against the inside of the casing 14 while its apex, as at "a", bears continuously against one of the shoulders 12, thus forming a continual contact from the wire 18, wheel 16, hub 15, casing 14, shoulders 12, and pin 5 to the harp 2 and from thence in the usual manner to the machinery of the car.

As will be readily seen the structure above described provides a trolley wheel which will have a continuous contact in a most effective manner and at the same time will be unable to become loose from the harp and reduce friction to a minimum.

From the foregoing description it will be readily seen that I have produced such a device as substantially fulfils the objects of the invention as set forth herein.

Having thus described my invention what I claim as new and useful and desire to secure by Letters Patent is:

A device of the character described comprising the combination of a trolley harp, a pin disposed in said trolley harp, said pin being provided with two spaced conical bearing shoulders, two bushings mounted over said pin and each bearing against one of said shoulders, a casing disposed over said bushings and having inwardly projecting ends holding said bushings in position, a wheel provided with a hub, the ends of said hub being bent inwardly to inclose said casing, as described.

In testimony whereof I affix my signature in presence of two witnesses.

WILLIAM H. ARNOLD.

Witnesses:
STEPHEN N. BLEWETT,
CLARENCE M. SMITH.

Copies of this patent may be obtained for five cents each, by addressing the "Commissioner of Patents, Washington, D. C."